United States Patent
Burns et al.

(10) Patent No.: US 9,872,586 B2
(45) Date of Patent: Jan. 23, 2018

(54) METHOD AND SYSTEM USING SETPOINT CONTROL TO MAINTAIN QUALITY OF OIL IN A FRYER

(71) Applicant: FRYMASTER L.L.C., Shreveport, LA (US)

(72) Inventors: Stephen Lynn Burns, Linden, TX (US); Make Morris, Shreveport, LA (US); Daron Hasley, Shreveport, LA (US); Michael Andrew Theodos, Bossier City, LA (US); Ezban F. Robertson, Shreveport, LA (US)

(73) Assignee: FRYMASTER L.L.C., Shreveport, LA (US)

( * ) Notice: Subject to any disclaimer, the term of this patent is extended or adjusted under 35 U.S.C. 154(b) by 474 days.

(21) Appl. No.: 14/229,255

(22) Filed: Mar. 28, 2014

(65) Prior Publication Data

US 2015/0272390 A1    Oct. 1, 2015

(51) Int. Cl.
*A47J 37/12*    (2006.01)

(52) U.S. Cl.
CPC ......... *A47J 37/1266* (2013.01); *A47J 37/129* (2013.01)

(58) Field of Classification Search
CPC ........ A47J 37/00; A47J 37/12; A47J 37/1223; A47J 37/1226; A47J 37/129
See application file for complete search history.

(56) References Cited

U.S. PATENT DOCUMENTS

| | | |
|---|---|---|
| 5,038,676 A | 8/1991 | Davis et al. |
| 5,379,683 A | 1/1995 | Ejiri et al. |
| 2004/0060452 A1 | 4/2004 | Suzuki |
| 2008/0084273 A1 | 4/2008 | Rodgers et al. |
| 2008/0229934 A1 | 9/2008 | Theodos et al. |
| 2009/0084273 A1* | 4/2009 | Lackman ............ A47J 37/1266 99/408 |

OTHER PUBLICATIONS

International Search Report dated Aug. 25, 2014 from corresponding PCT/US2014/032358, pp. 3.
International Written Opinion dated Aug. 25, 2014 from corresponding PCT/US2014/032358, pp. 4.
International Preliminary Report on Patentability (IPRP) dated Apr. 1, 2016 from corresponding PCT/US2014/032358, pp. 6.

* cited by examiner

*Primary Examiner* — Brian Jennison
(74) *Attorney, Agent, or Firm* — Ohlandt, Greeley, Ruggiero & Perle, L.L.P.

(57) ABSTRACT

A method for filling a fryer pot in a fryer with a volume of cooking oil includes determining if the fryer has commenced a setpoint control operation, and opening a valve and activating a pump to fill the fryer pot with oil when the fryer has commenced the setpoint control operation.

9 Claims, 12 Drawing Sheets

METHOD AND SYSTEM USING SETPOINT CONTROL TO MAINTAIN QUALITY OF OIL IN A FRYER

BACKGROUND OF THE DISCLOSURE

1. Field of the Disclosure

This disclosure relates to deep fat fryers for the food service industry. More particularly, this disclosure relates to deep fat fryers for the food service industry that are capable of filling and maintaining a volume of cooking oil in a cooking receptacle. Still more particularly, this disclosure relates to deep fat fryers that are capable of filling and maintaining a volume of cooking oil in a cooking receptacle where a temperature of used oil in the cooking receptacle that is detected each time a top-off operation is commenced is variable depending on one or more conditions.

2. Description of Related Art

Deep fryers are a necessity of the food service industry and particularly for the fast food service industry. For quick cooking of foods, the cooking oil must be filled in the cooking pot and be of a particular temperature at all times. During the cooking process much of the oil is absorbed by a food product, resulting in loss of oil volume. Furthermore, the rate of temperature rise is directly related to shortened oil life. Accordingly, there is a need to keep the volume of oil at optimal levels during the cooking process to minimize oil degradation caused by the heating process. Thus there is a need to keep the fryer full of oil at all times during the cooking process. Without an automatic system to maintain the oil at an optimal level and optimal temperature the operator could overlook the oil volume while cooking and reduce the effective life of the cooking oil.

The ambient environment includes conditions or variables such as temperature and pressure that can differ, for example, based upon geographic location. Taking into account these variables can lead to longer oil life by beginning an automatic system to maintain the oil at an optimal level at an earlier time based upon variables in the ambient environment reducing the rate of temperature rise. Conversely, taking into account these variables can lead to longer oil life by beginning an automatic system to maintain the oil at an optimal level at a later time based upon variables in the ambient environment prolonging the rate of temperature rise.

In current fryer operations in which systems are in place to add new oil into fryer pots, under certain conditions pots are being overfilled. This does not mean that the oil level overfills the side walls of the pot. It is just higher than the desired level. Overfilling results in too much oil being used in the frypot which contributes to increase oil usage and decreased oil life. Both cases exacerbate overhead cost to the store. Even though the amount of oil is minimal, it does affect oil quality.

Accordingly, there is a need for a deep fryer that fills and maintains the desired cooking oil volume and temperature for commercial deep fat fryers without operator intervention. In addition, there is a need for a deep fryer that fills and maintains the desired cooking oil volume and takes into account variables.

SUMMARY OF THE DISCLOSURE

A fryer is provided that includes a pump that pumps new oil. A valve is connected to the pump. A fryer pot is connected to the valve. The fryer pot has a heating source and a temperature sensor in a cooking area. The fryer pot holds used oil in the cooking area. A controller opens the valve and activates the pump to fill the fryer pot with the new oil during a top-off operation. The temperature sensor detects a temperature of the used oil that is variable based on one or more conditions each time the controller commences the top-off operation.

A method for filling a fryer pot in a fryer with a volume of cooking oil is also provided that includes determining if said fryer has commenced a setpoint control operation; and opening a valve and activating a pump to fill said fryer pot with oil when said fryer has commenced said setpoint control operation.

The above-described and other features and advantages of the present disclosure will be appreciated and understood by those skilled in the art from the following detailed description, drawings, and appended claims.

BRIEF DESCRIPTION OF THE DRAWINGS

Other and further benefits, advantages and features of the present disclosure will be understood by reference to the following specification in conjunction with the accompanying drawings, in which like reference characters denote like elements of structure and.

DETAILED DESCRIPTION OF THE PREFERRED EMBODIMENT

Figure 1:
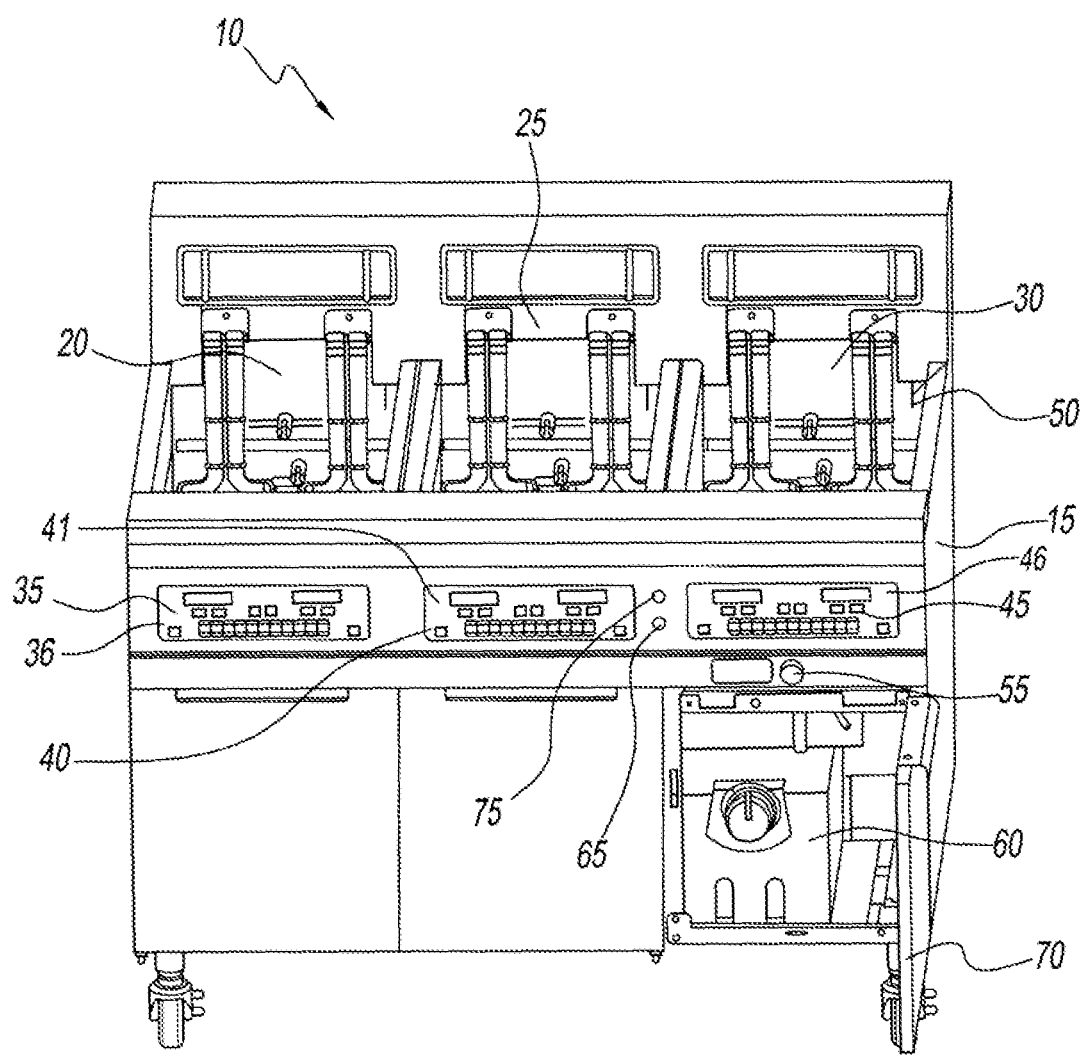
FIG. 1 illustrates a front view of a deep fryer having three fryer pots and an internal fixed reservoir according to the present disclosure.

Referring to FIG. 1, a front perspective view of a deep fryer is shown, and generally referred to by reference numeral 10. Deep fryer 10 has a housing 15 and three deep fryer pots 20, 25 and 30. Pots 20, 25 and 30 each contains oil for deep frying foods commonly used in the commercial food industry. Pots 20, 25 and 30 each have a dedicated control panel 35, 40 and 45, respectively, that controls aspects of cooking for the particular pot. Control panel 35, 40 and 45 include user input devices and output devices that are each connected to a fryer controller 36, 41 and 46. Housing 15 also has fill tubes 50 associated with each of the particular pots 20, 25 and 30 that are individually controllable. Housing 15 also has at its front a power button 55, an oil reservoir 60 and an indicator lamp 65 operatively associated with oil reservoir 60. Housing 15 also has individual doors 70 that are opened to provide access to oil reservoir 60. Further doors 70 can also be opened and used for periodic maintenance necessary for commercial cooking systems. Housing 15 also has an indicator lamp 75 energized by control panels 35, 40, and 45 at a predetermined time to indicate the need for filtration. While housing 15 is shown having three fryer pots, the housing could contain any number of fryer pots depending upon the needs of the food service professional.

Figure 2:
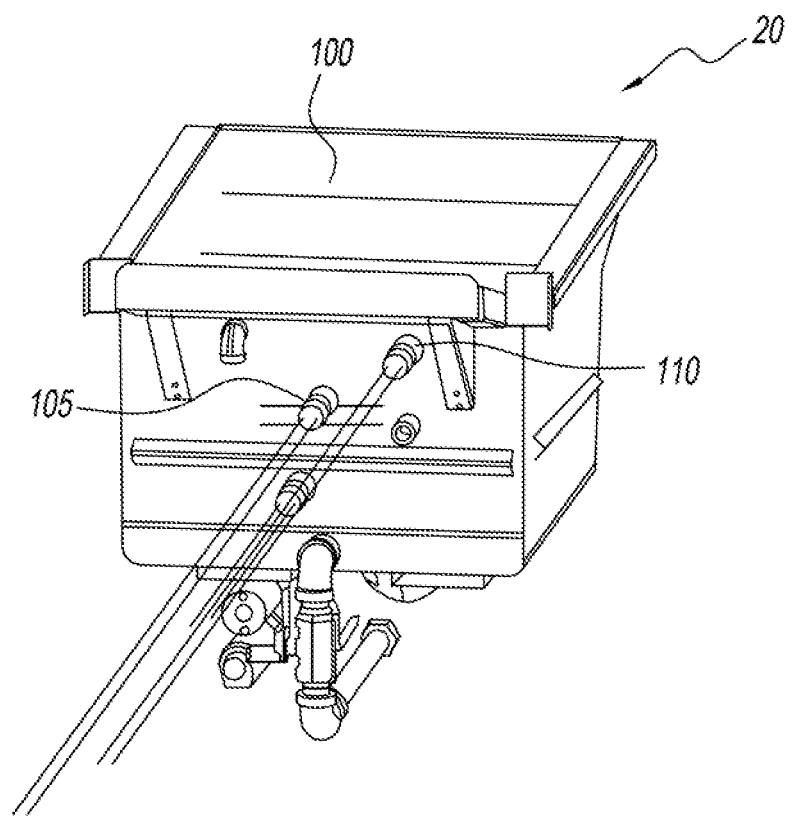
FIG. 2 illustrates a rear perspective view of a fryer pot having temperature sensors, according to the present disclosure.
Figure 3:
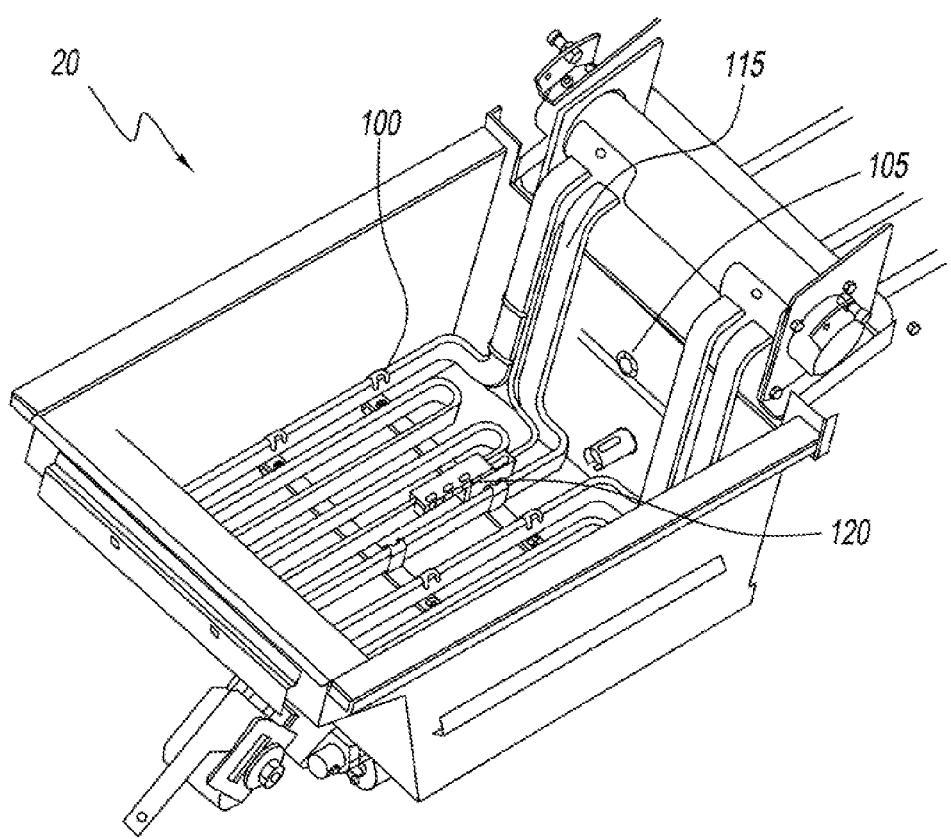
FIG. 3 illustrates a front perspective view of the a fryer pot according to the present disclosure.

Referring to FIGS. 2 and 3, an individual deep fryer pot 20 is shown. Deep fryer pots 25 and 30 of FIG. 1 each have the same elements and function as deep fryer pot 20. Deep fryer pot 20 has a cooking area 100 and a submersible thermal sensor 105 and a fryer temperature probe 120. Pot 20 also has a submersible safety thermal sensor 110 and an internal heating source 115. Heating source 115 has temperature sensor 120 associated therewith. Heating source 115 is shown as an electric heating element, however, heating source 115 may be a gas heater that has a gas probe associated therewith instead of fryer temperature probe 120.

In another embodiment, sensors 105, 110 and 120 are each a temperature sensor. In still other embodiments, sensors 105, 110 and 120 are each a thermal switch.

Figure 4:
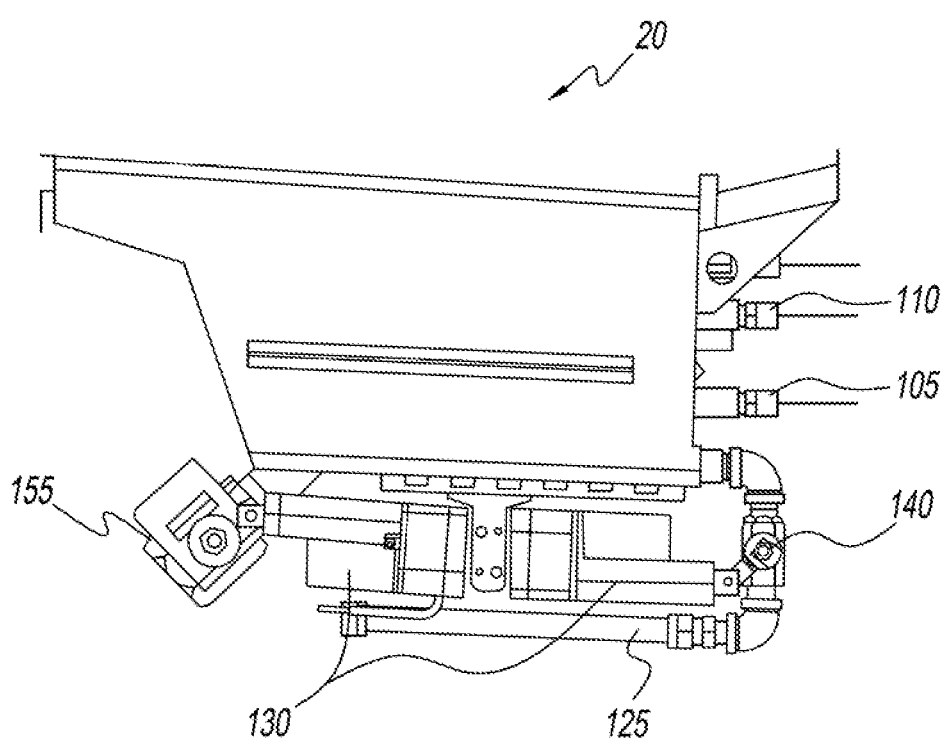
FIG. 4 illustrates a side view of the fryer pot according to the present disclosure.
Figure 5:
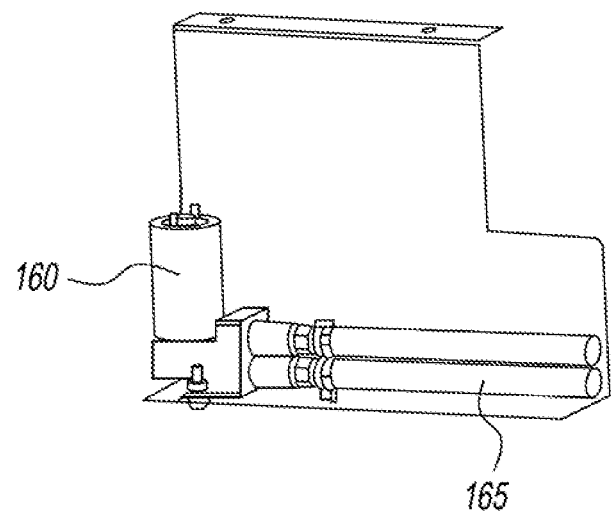
FIG. 5 illustrates a pump, according to the present disclosure.

Referring to FIGS. 1, 4 and 5, pot 20 has a drain valve 155 driven by one of a pair of linear motion motors 130 that drains used oil from pot 20. Pot 20 also has a pipe system 125 that feeds used oil into pot 20 via an oil return valve 140 driven by the other of the pair of linear motion motors 130. Pump 160 associated with pot 20 operates to feed new oil to pot 20 through piping 165, through oil return valve 140. Alternatively, piping 165 can be separate from piping 125 that feeds used oil to pot 20 during a filtering operation.

Pump 160 and piping 165 are operatively connected to fill pots 20, 25 and 30 in response to a heating system control. Pump 160 serves three fill pots 20, 25 and 30 depending upon the level of cooking oil in a respective pot through oil return valve 140.

Figure 8:
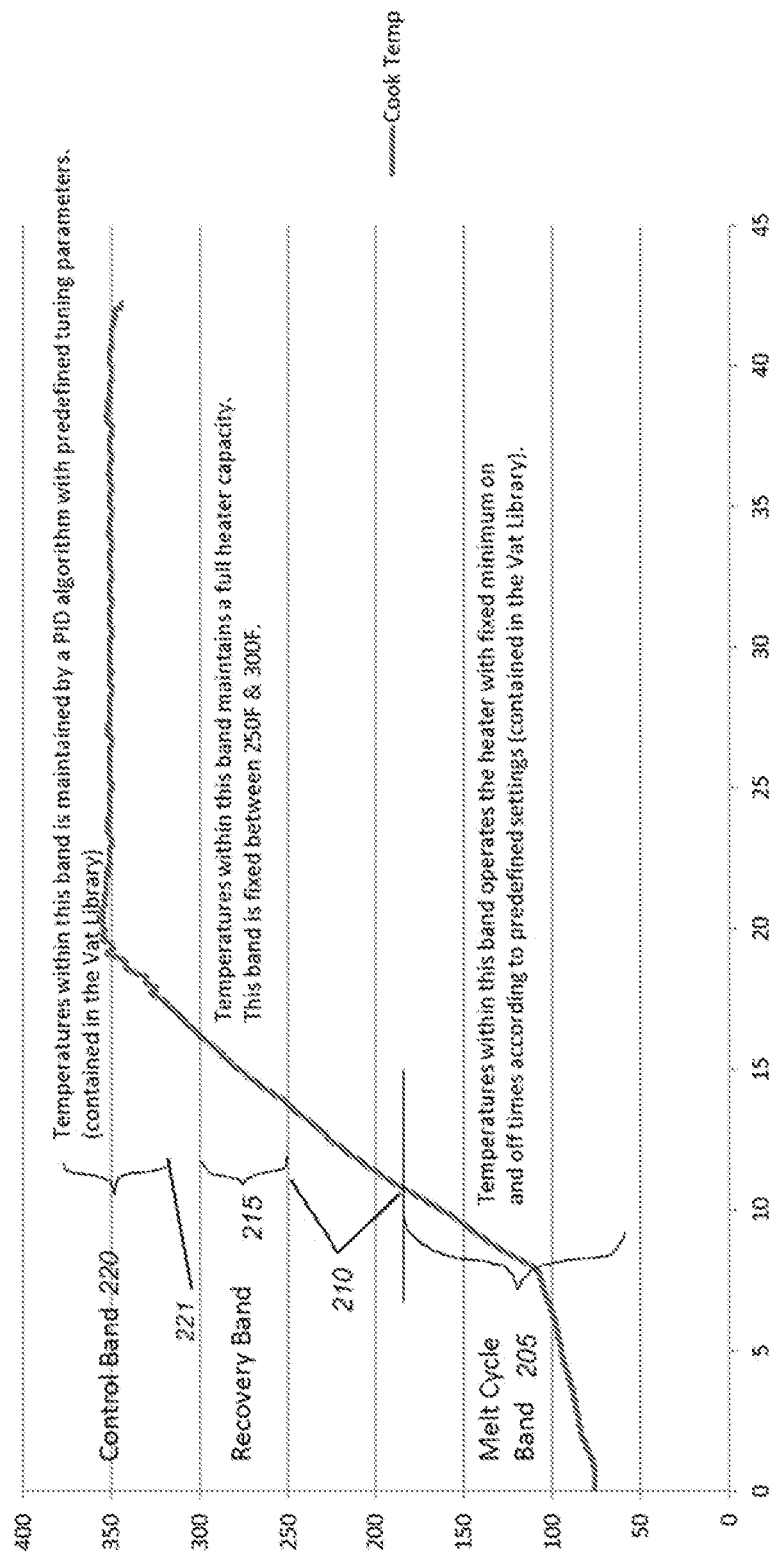
FIG. 8 is a typical temperature curve of the deep fryer according to the present disclosure.

Fryer controllers 36, 41 and 46 control the operation of the heating system control. Referring to FIG. 8, the heating system control includes a melt cycle operation 205, a pre-recovery operation 210, a recovery operation 215, and a setpoint control operation 220. Melt cycle 205 operation cycles heat by activating and deactivating internal heating source 115 according to predefined times that can be set forth in an algorithm. Pre-recovery operation 210 turns internal heating source 115 on at full on capacity for heating oil in cooking area 100. Recovery operation 215 maintains internal heating source 115 on at full on capacity for a predetermined duration of a recovery band that can be controlled by a recovery test algorithm. Setpoint control operation 220 maintains a setpoint temperature of the oil in cooking area 100 within a control band. Internal heating source 115 can be controlled by a setpoint control algorithm to maintain the setpoint temperature of the oil in cooking area 100 within the control band by activating and deactivating internal heating source 115.

The setpoint control algorithm utilizes the widely used Proportional, Integral, Derivative ("PID") method of process control. This adaptation determines the on and off, for example, activating and deactivating, times of internal heating source 115. The temperature of the oil in cooking area 100 is the measured or controlled variably and activation and deactivation of internal heating source 115 (ON/OFF) is the manipulated variable. In the generic form of this PID algorithm $(O(t)=(Kp \times e)+Kdd(e)/dt+Ki \int e \, dt)$ where e is error, Kp is a proportional constant, Kd is a derivative constant, and Ki is an integral constant. The proportional gain (Kp) is determined by establishing a temperature proportional band (range 0-40 degrees Fahrenheit), the integral and differential gains are a predetermine constant (range 0-5). The result O(t) falls in a predetermined range of values as a percentage of time (range 0-100%, of time 0-60 seconds) in which internal heating source 115 is activated, or on, and a predetermined range of values in which internal heating source 115 is deactivated, or off.

The results of the PID algorithm is used in conjunction with other requirements to determine the state of internal heating source 115 including early heat cutoff; cook to idle and related cook cycle transitions; instant on, and temperature dynamics around the geometric center of the frypot. Operation will be described with respect to fryer pot 20. In operation when fryer pot 20 is turned on and during start up, new oil pump 160 is enabled by fryer controller 36 when internal heating source 115 is deactivated for the first time after fryer controller 36 commences setpoint control operation 220. A timer may be activated after internal heating source 115 is deactivated for the first time after fryer controller 36 commences setpoint control operation 220 so that new oil 160 is pumped after a predetermined time, e.g., 3 minutes. The temperature of oil in pot 20 in which fryer controller 36 commences setpoint control operation 220 is not the same every time fryer controller 36 commences setpoint control operation 220. A temperature in the control band that commences setpoint control operation 220 varies based upon ambient conditions, set point, oil condition, rate of rise and tuning parameters. Additional conditions that may vary the temperature in the control band that commences setpoint control operation 220 include debris on and around fryer temperature probe 120 in electric fryers and/or gas fryers, voltage communicated to fryer 10 in electric fryers and wattage of heating source 115 in electric fryers. A lower bound 221 of setpoint control operation 220 is in a range of 338 degrees Fahrenheit to 342 degrees Fahrenheit where 350 degrees Fahrenheit is the setpoint as one example.

For example, fryer temperature probe 120 detects and outputs a first series of first temperatures of the oil in pot 20 over a first time period to fryer controller 36 during start up on Day 1. Fryer controller 36 determines a first rate of rise in temperature on Day 1. Fryer temperature probe 120 detects and outputs a second series of second temperatures of the oil in pot 20 over a second time period to fryer controller 36 during start up on Day 2. Fryer controller 36 determines a second rate of rise in temperature on Day 2. If the second rate of rise in temperature on Day 2 is greater than the first rate of rise in temperature on Day 1, fryer controller 36 activates new oil pump 160 at an earlier time on Day 2 than on Day 1 given the same ambient conditions, set point, oil condition, and tuning parameters.

In the case where pot 20 is already hot, if fryer controller 36 enters setpoint control operation 220, operation is the same as when fryer pot 20 is turned on and during start up. The starting of a cook in pot 20 automatically enters pot 20 into setpoint control operation 220.

Figure 9:
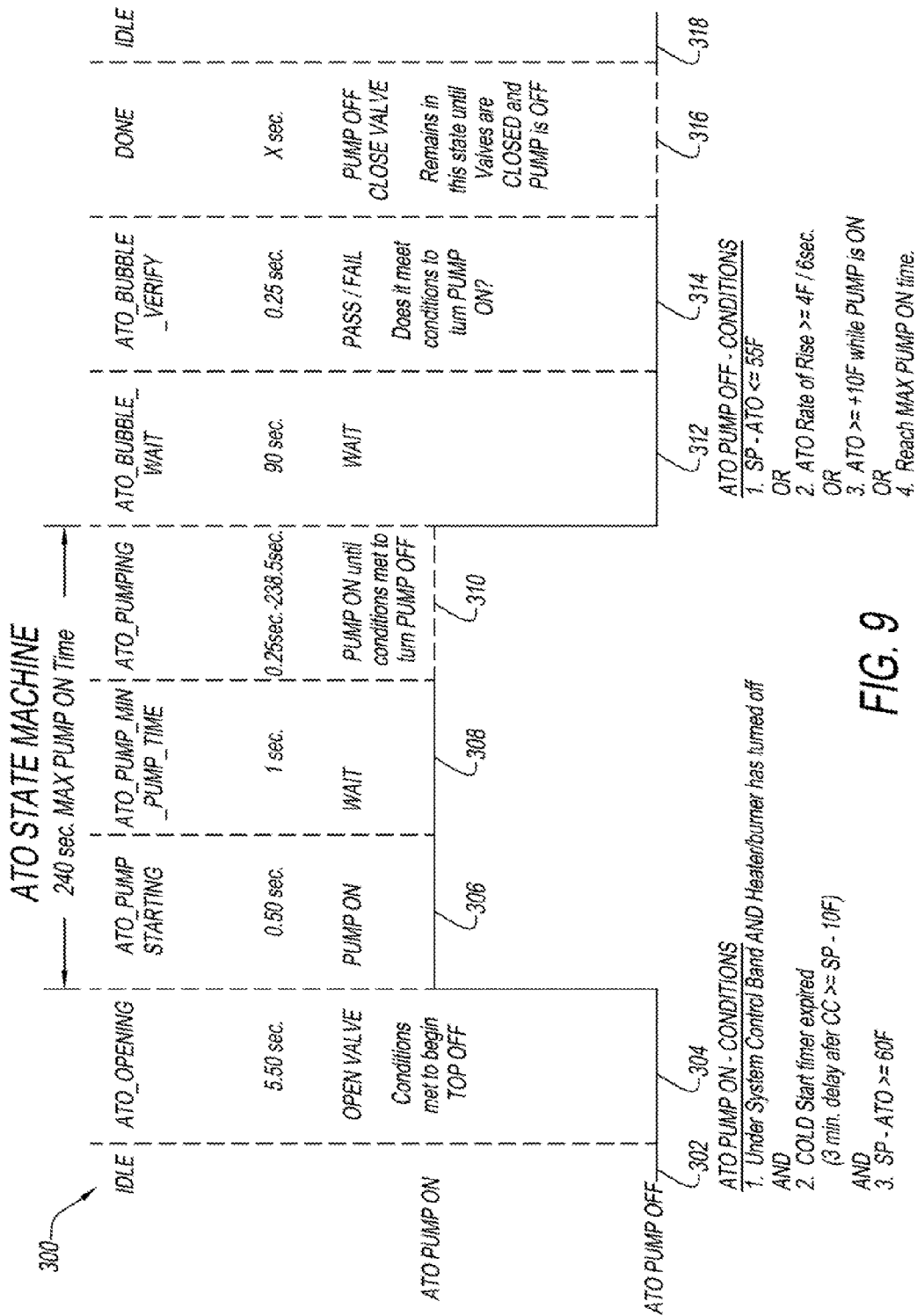
FIG. 9 is a time line of a process of automatically filling the deep fryer having fryer oil therein with new oil according the present disclosure.

Referring to FIG. 9, a timeline 300 is shown. Fryer 10 is idle at time 302 and pump 160 is deactivated. At time 304, fryer controller 36 begins a timer for 5.50 seconds and fryer controller 36 determines if the conditions to start pumping new oil have been met. The conditions to start pumping new oil into cooking area 100 include when fryer 10 is in setpoint control operation 220 and internal heating source 115 is deactivated for the first time after fryer controller 36 commences setpoint control operation 220, a 3 minute delay has expired after a measured temperature of fryer temperature probe 120 is greater than or equal to a setpoint minus 10 degrees Fahrenheit, and the setpoint minus a detected temperature at time 304 by submersible thermal sensor 105 is greater than or equal to 60 degrees Fahrenheit. If fryer controller 36 determines that the conditions to start pumping new oil have been met, oil return valve 140 is opened. The setpoint is for example between about 300 degrees Fahrenheit to about 376 degrees Fahrenheit.

At time 306, pump 160 is activated since return valve is open, and fryer controller 36 begins a timer for 0.50 seconds. At time 308, pump 160 is on for its minimum required time, for example, between 1 second and 238 seconds, and fryer controller 36 begins a timer for 1 second. At time 310, fryer controller 36 determines if pump 160 has been on for a maximum required time, 240 seconds as shown, or conditions to stop pumping have been met, and fryer controller 36 commences a timer to measure a time between 0.25 seconds to 238.50 seconds. The conditions to stop pumping are when the setpoint minus a detected temperature detected by submersible thermal sensor 105 is less than or equal to 55 degrees Fahrenheit, or a series of detected temperature by submersible thermal sensor 105 over time has a rate of rise of greater than or equal to (4 degrees Fahrenheit)/(6 seconds), or an increase in temperature detected by submersible thermal sensor 105 from time 306 to time 310 is greater than or equal to 10 degrees Fahrenheit, or a maximum required time, 240 seconds in this case, has expired.

At time 312, fryer controller 36 begins a timer for 90 seconds so that a condition that can occur where air bubbles in piping 165 that create a false feedback that the pot is full can subside. At time 314, rechecking submersible thermal sensor 105 to determine if pump 160 can be turned off due to potential incorrect reading from bubbles, e.g., fryer controller 36 determining if fryer 10 is in setpoint control operation 220 and internal heating source 115 is deactivated for the first time after fryer controller 36 commences setpoint control operation 220, fryer controller 36 determines if a 3 minute delay has expired after a measured temperature by fryer temperature probe 120 is greater than or equal to a setpoint minus 10 degrees Fahrenheit, and fryer controller 36 determines if the setpoint minus a detected temperature by submersible thermal sensor 105 at time 314 is greater than or equal to 60 degrees Fahrenheit. At time 314, fryer controller 36 commences a timer for 0.25 seconds. At time 316, fryer controller 36 commences a timer between a range of 0 seconds and 240 seconds, pump 160 deactivated and oil return valve 140 is closed by fryer controller 36, fryer 10 remains in time 316 until oil return valve 140 is closed and pump 160 is deactivated. At time 320, fryer 10 is in idle condition.

Figure 12:
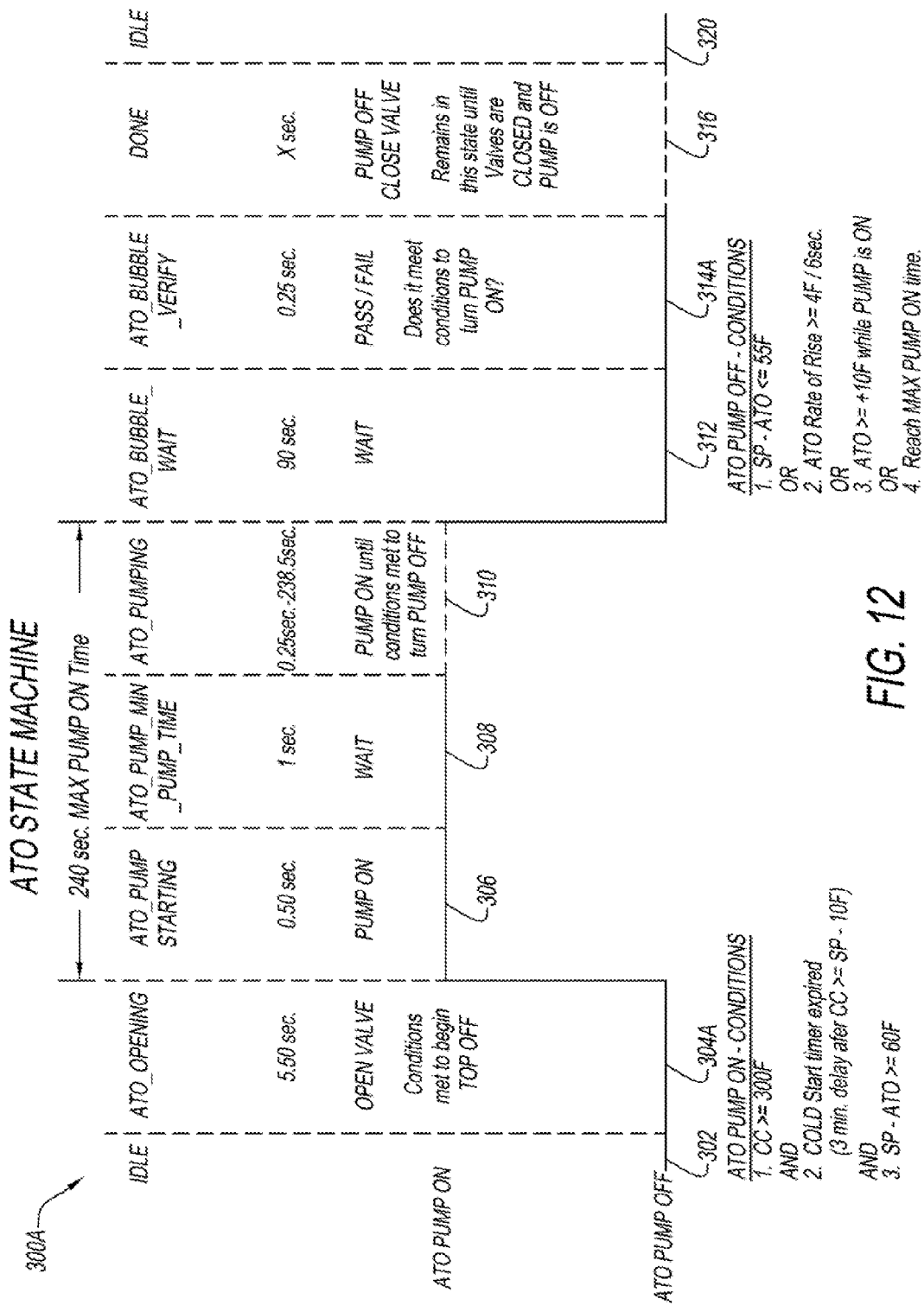
FIG. 12 is a time line of another process of automatically filling the deep fryer having fryer oil therein with new oil according the present disclosure.

Referring to FIG. 12, a timeline 300A is shown. Timeline 300A is the same as timeline 300 except for time 304A is different than time 304 and time 314A is different than time 314. At time 304A, fryer controller 36 begins a timer for 5.50 seconds and fryer controller 36 determines if the conditions to start pumping new oil have been met. The conditions to start pumping new oil into cooking area 100 include when fryer temperature probe 120 detects a temperature of greater than or equal to 300 degrees Fahrenheit, a 3 minute delay has expired after a measured temperature of fryer temperature probe 120 is greater than or equal to a setpoint minus 10 degrees Fahrenheit, and setpoint minus a detected temperature at time 304A by submersible thermal sensor 105 is greater than or equal to 60 degrees Fahrenheit. If fryer controller 36 determines that the conditions to start pumping new oil have been met oil, return valve 140 is opened by fryer controller 36. The setpoint is for example between 300 degrees Fahrenheit and 376 degrees Fahrenheit. At time 314A, fryer controller 36 rechecks submersible thermal sensor 105 to determine if pump 160 can be turned off due to potential incorrect reading from bubbles, e.g., fryer controller 36 determining if fryer temperature probe 120 detects a temperature of greater than or equal to 300 degrees Fahrenheit, fryer controller 36 determines if a 3 minute delay has expired after a measured temperature by fryer temperature probe 120 is greater than or equal to a setpoint minus 10 degrees Fahrenheit, and fryer controller 36 determines if the setpoint minus a detected temperature by submersible thermal sensor 105 at time 314A is greater than or equal to 60 degrees Fahrenheit. At time 314, fryer controller 36 commences a timer for 0.25 seconds.

Figure 10:
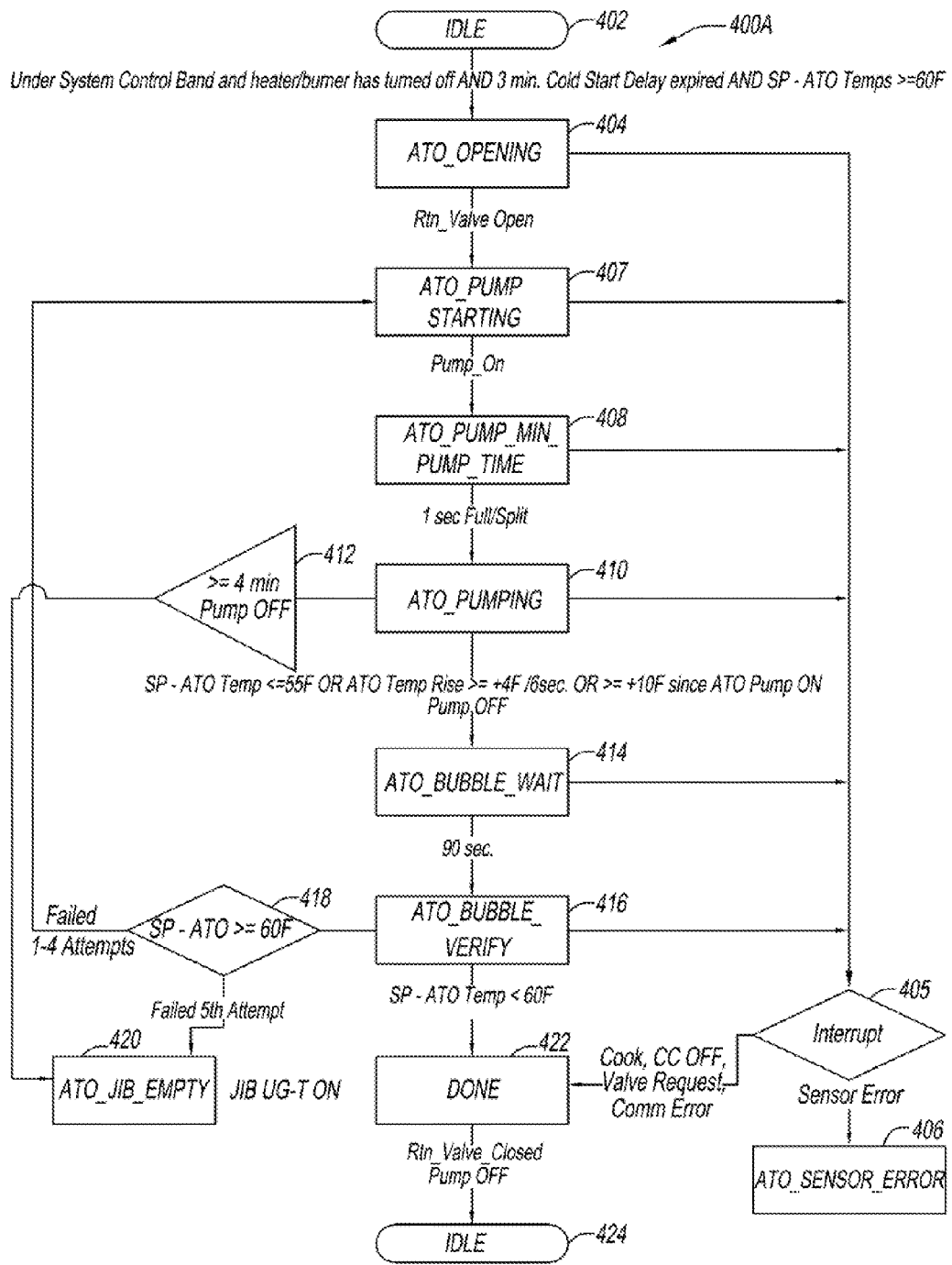
FIG. 10 is a logic diagram of a process of automatically filling the deep fryer having fryer oil therein with new oil according the present disclosure.

FIG. 10 shows a method 400 for automatically topping off fryer 10 having fryer oil therein and filing fryer 10 with additional new oil. In step 402 fryer 10 is idle and pump 160 is deactivated. Method 400 proceeds from step 402 to step 404. In step 404, oil return valve 140 is opened when (1) fryer 10 is in setpoint control operation 220, (2) internal heating source 115 is deactivated for the first time after setpoint control operation 220 is commenced; (3) a 3 minute delay has expired after a measured temperature by submersible thermal sensor 105 is greater than or equal to a setpoint minus 10 degrees Fahrenheit in step 404, and (4) if the difference of the setpoint minus a detected temperature by submersible thermal sensor 105 in step 404 is greater than or equal to 60 degrees Fahrenheit. The setpoint is for example between 300 degrees Fahrenheit and 376 degrees Fahrenheit.

Method 400 proceeds to step 407 from step 404. In step 407, pump 160 is activated since return valve is open. Method 400 proceeds to step 408 from step 407. In step 408, pump 160 is on for its minimum required time between 1 second and 238 seconds. Method 400 proceeds to step 410 from step 408. In step 410, fryer controller 36 determines if pump 160 has been on for a maximum required time, or conditions to stop pumping have been met. The conditions to stop pumping are when the setpoint minus a detected temperature by submersible thermal sensor 105 is less than or equal to 55 degrees Fahrenheit, or a series of detected temperatures by submersible thermal sensor 105 over time has a rate of rise of greater than or equal to (4 degrees Fahrenheit)/(6 seconds), or an increase in temperature from step 407 to step 410 is detected by submersible thermal sensor 105 is greater than or equal to 10 degrees Fahrenheit, or a maximum required time, 240 seconds in this case, has expired.

If a maximum required time, 240 seconds in this case, has expired, method 400 proceeds from step 410 to step 420. If the setpoint minus a detected temperature by submersible thermal sensor 105 is less than or equal to 55 degrees Fahrenheit, or a series of detected temperature by submersible thermal sensor 105 over time has a rate of rise of greater than or equal to (4 degrees Fahrenheit)/(6 seconds), or an increase in temperature from step 407 to step 410 is detected by submersible thermal sensor 105 is greater than or equal to 10 degrees Fahrenheit, then method 400 proceeds from step 410 to step 414. In step 414, a timer for 90 seconds is commenced so that a condition that can occur where air bubbles in piping 165 create a false feedback that the pot is full can subside.

Method 400 proceeds from step 414 to step 416. In step 416, submersible thermal sensor 105 is rechecked to determine if pump 160 can be turned off due to potential incorrect reading from bubbles. In step 416, if a difference of the setpoint minus a detected temperature by submersible thermal sensor 105 in step 416 is determined to be less than 60 degrees Fahrenheit, then method 400 proceeds from step 416 to step 422. In step 416, if a difference of the setpoint minus a detected temperature by submersible thermal sensor 105 in step 416 is determined to be greater than or equal to 60 degrees Fahrenheit, then method 400 proceeds from step 416 to step 418. In step 418, it is determined if a difference of the setpoint minus a detected temperature by submersible thermal sensor 105 during step 418 is determined to be greater than or equal to 60 degrees Fahrenheit, then method 400 proceeds from step 418 to step 407 so that steps 407, 408, 410, 412, 414 and/or 416 are repeated. In step 418, if steps 407, 408, 410, 412, 414 and/or 416 have been repeated four times, and it is determined a difference of the setpoint minus a detected temperature by submersible thermal sensor 105 at a time during step 418 is determined to be greater than or equal to 60 degrees Fahrenheit, then method 400 proceeds from step 418 to step 420.

If during steps 404, 407, 408, 410, 414 and/or 416, a condition is detected, for example, a cook may be commenced, the fryer controller 36 may be turned off, a valve request, or communication error may be detected, then method 400 proceeds to step 405. In step 405, if a predetermined condition is detected, for example, a cook may be commenced, the fryer controller 36 may be turned off, a valve request, or communication error may be detected, then method 400 proceeds from step 405 to step 422. In step 405, if an error is detected, then method 400 proceeds from step 405 to step 406. In step 406 if conditions are met indicating that submersible thermal sensor 105 has failed, then method 400 proceeds from step 406 to step 422.

In step 420, it is indicated to a user that reservoir 60 is empty and needs to be replaced. Method 400 proceeds from step 420 to step 422. In step 422, oil return valve 140 is closed and pump 160 is deactivated when a difference of the setpoint minus a detected temperature by submersible thermal sensor 105 during step 416 is determined to be less than 60 degrees Fahrenheit, reservoir 60 is empty, or submersible thermal sensor 105 has failed. Method 400 proceeds from step 422 to step 424. In step 424, fryer 10 is in idle condition.

Figure 13:
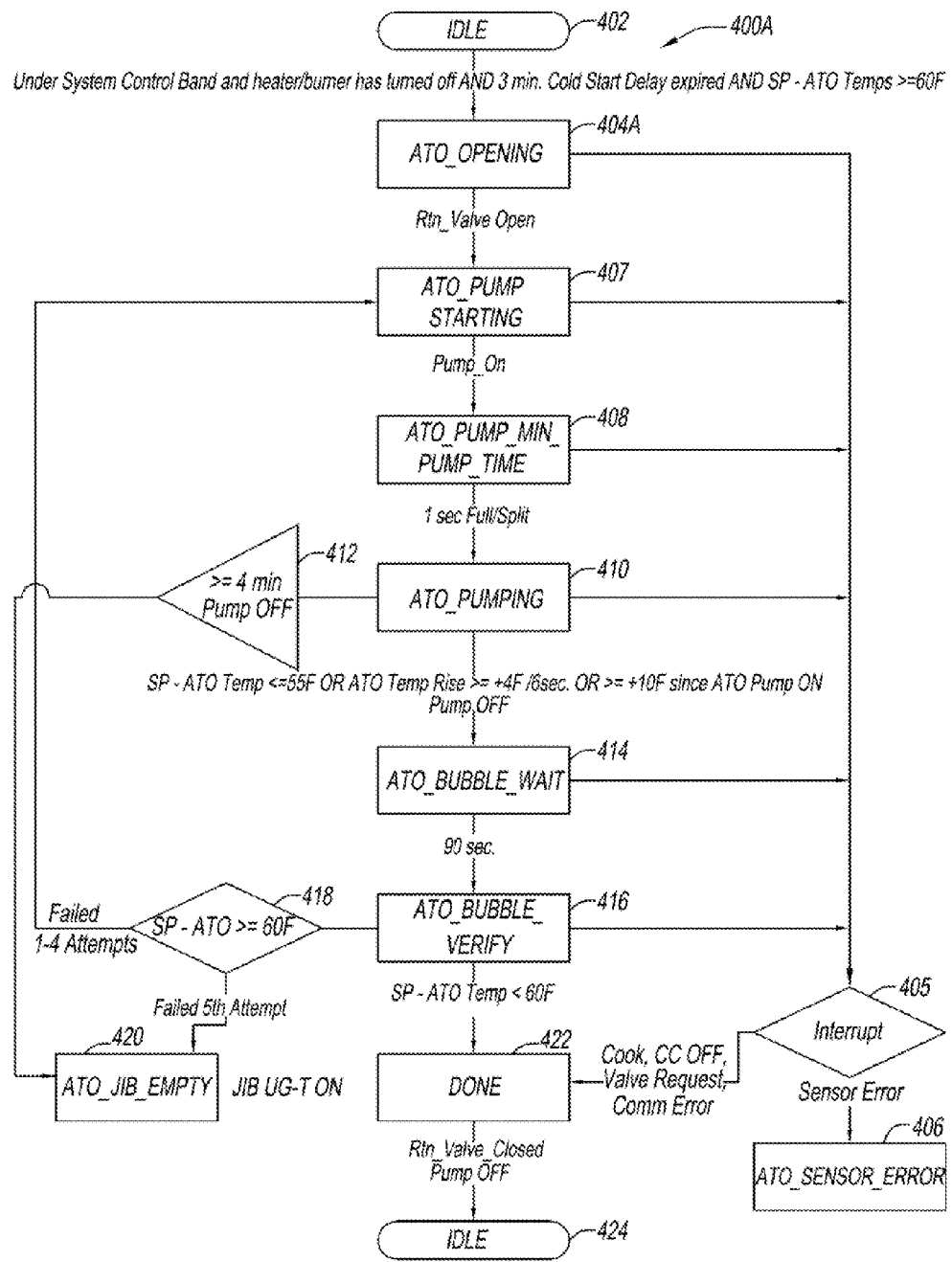
FIG. 13 is a logic diagram of the process of FIG. 12 of automatically filling the deep fryer having fryer oil therein with new oil according the present disclosure.

Referring to FIG. 13, method 400A is the same at method 400, however, step 404A is different than step 404. Method 400 proceeds from step 402 to step 404A. In step 404A, oil return valve 140 is opened when (1) fryer temperature probe 120 detects a temperature of greater than or equal to 300 degrees Fahrenheit; (2) a 3 minute delay has expired after a measured temperature by submersible thermal sensor 105 is greater than or equal to a setpoint minus 10 degrees Fahrenheit in step 404A, (3) and if the difference of the setpoint minus a detected temperature by submersible thermal sensor 105 in step 404A is greater than or equal to 60 degrees Fahrenheit. The setpoint is for example between 300 degrees Fahrenheit and 376 degrees Fahrenheit. Method 400A proceeds to step 407 from step 404A.

The purpose of fryer controller 36 monitoring temperature sensor 120 is to prevent premature operation of pump 160 and inappropriately filling of pot 20 and a possible over fill scenario. Additionally, the volume of cool oil is much lower than that of hot oil. Temperature sensor 120 monitored by fryer controller 36 will also prevent pump 160 from prematurely engaging during the startup period when the oil volume is low because of the relatively low temperature. Further, when sensor 120 senses a predetermined low, for example, temperature lower than approximately 235° F. to 265° F., then fryer controller 36 prevents pump 160 from being activated, thus preventing topping off of a system that is drained or not in use.

A second submersible safety thermal sensor 110 that is located higher in pot 20 than submersible thermal sensor 105. Submersible safety thermal sensor 110 is wired in series electrically with pump 160 to stop the filling operation. The second submersible safety thermal sensor 110 acts as a safety feature to prevent pot 20 from overflowing. Further, an additional safety feature is an off delay timer operatively associated with pump 160 to stop its operation and prevent overflow. Submersible safety sensor 110 also preserves pump life in the event that there is a low level of oil in reservoir or the reservoir oil in not replaced by the user.

While the filling system has been described as having an immersed temperature sensor 120 associated with heating source 115, temperature sensor 120 could also have been located on a side of fryer pot 20 to sense a temperature at the surface of fryer pot 20 as well.

New oil may be fed into fry pot 20 so that the new oil comes in above the oil line through separate piping and terminating at fill tubes 50, preventing the new oil from coming in contact with used oil and from being contaminated before it enters pot 20. By having a higher entry point, the possibility of disturbing crumbs at the bottom of pot 20 is eliminated. Further, higher entry point reduces the likelihood that solenoid valves will become dogged.

Figure 6:
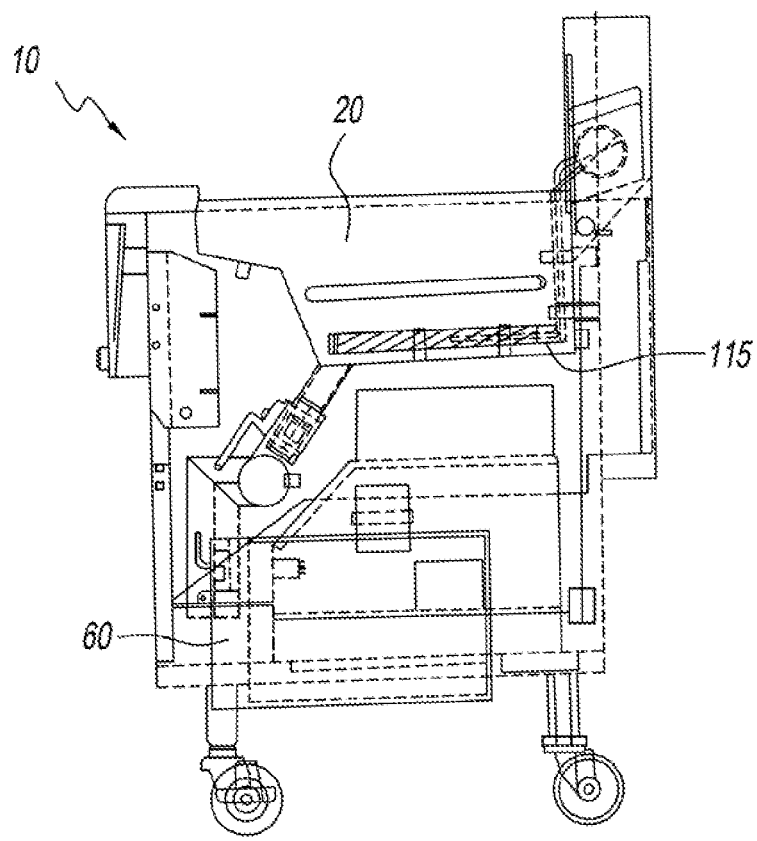
FIG. 6 illustrates a side view of the deep fryer housing, according to the present disclosure.
Figure 7:
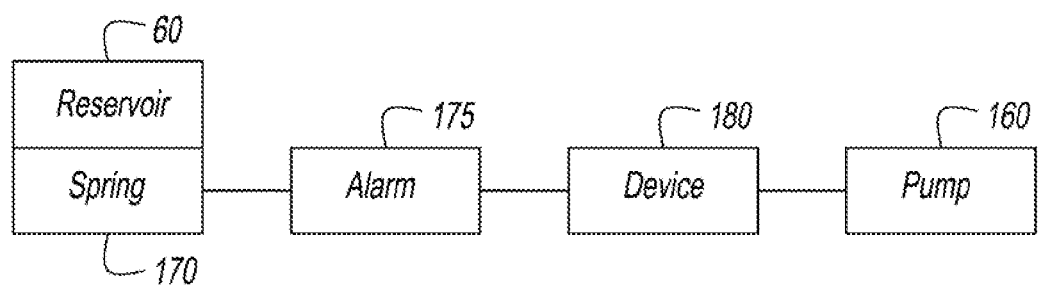
FIG. 7 is a block diagram of an alarm system of the deep fryer.

Referring to FIGS. 1, 6, and 7, the housing 15 and reservoir 60 are shown. The oil used to fill fry pots 20, 25 and 30 is located in reservoir 60. To alert a user that oil in reservoir 60 is at a low level, a device, such as a spring 170 on which reservoir 60 rests, expands to raise reservoir 60 and activate an alarm or light 175. Alternatively, alarm or light 175 may be activated by a device 180, such as an off delay timer operatively associated with pump 160 that detects that the predetermined expected interval to refill the fryer pot has been exceeded, indicating reservoir 60 is empty. Then the individual reservoir is removed and a new filled reservoir is inserted. Alternatively, a single permanent reservoir is placed below all fryer pots 20, 25 and 30 and the permanent reservoir is filled.

Figure 11:
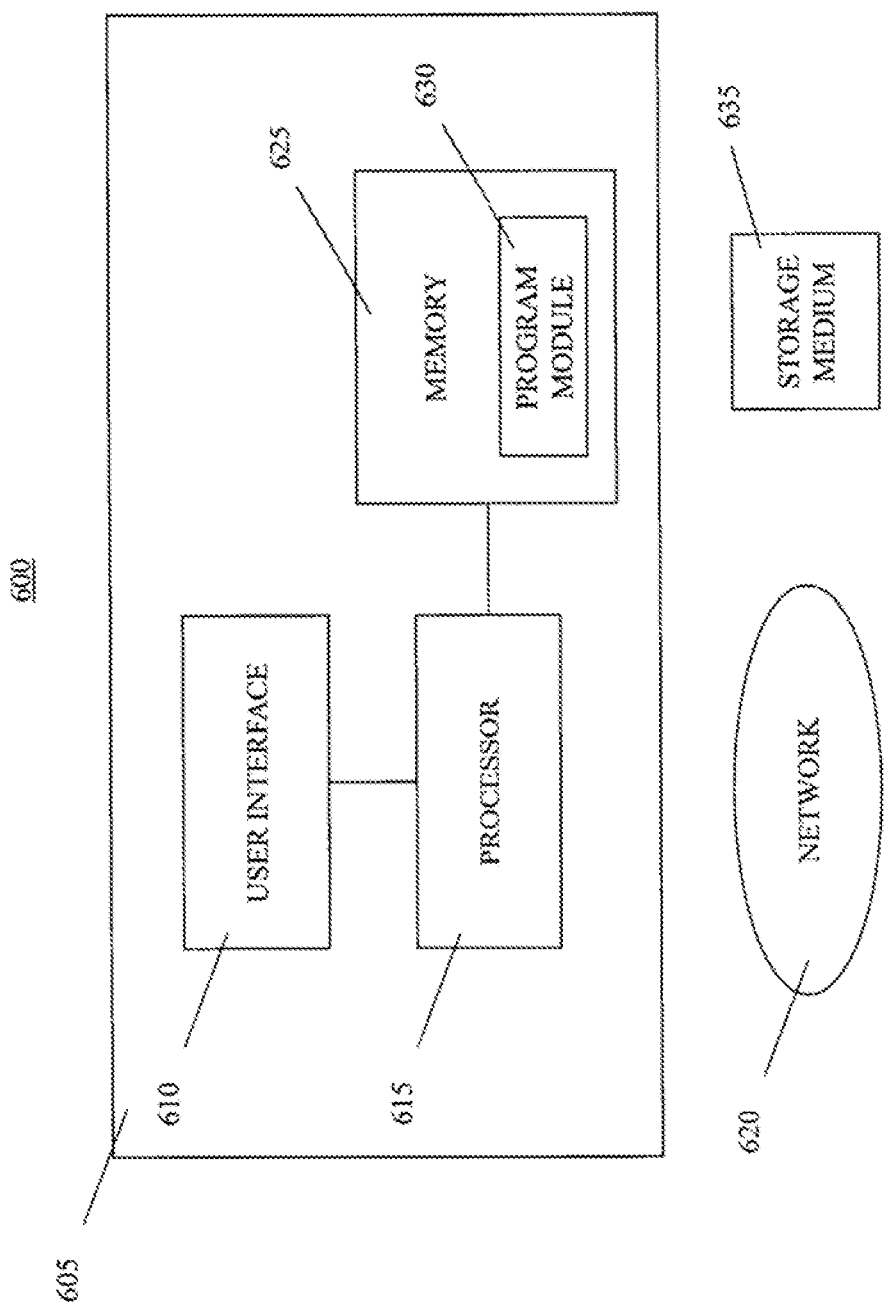
FIG. 11 is a block diagram depicting a computer system which implements the processes of the present disclosure.

FIG. 11 is a block diagram of a system 600 for employment of the present disclosure. System 600 includes a computer 605 coupled to a network 620, e.g., the Internet.

Computer 605 includes a user interface 610, a processor 615, and a memory 625. Computer 605 may be implemented on a general-purpose microcomputer. Although computer 605 is represented herein as a standalone device, it is not limited to such, but instead can be coupled to other devices (not shown) via network 620.

Processor 615 is configured of logic circuitry that responds to and executes instructions.

Memory 625 stores data and instructions for controlling the operation of processor 615. Memory 625 may be implemented in a random access memory (RAM), a hard drive, a read only memory (ROM), or a combination thereof. One of the components of memory 625 is a program module 630.

Program module 630 contains instructions for controlling processor 615 to execute the methods described herein. For example, as a result of execution of program module 630, processor 615 perform the actions of: determining if said fryer has commenced a setpoint control operation; and opening a valve and activating a pump to fill said fryer pot with oil when said fryer has commenced a setpoint control operation.

The term "module" is used herein to denote a functional operation that may be embodied either as a stand-alone component or as an integrated configuration of a plurality of sub-ordinate components. Thus, program module 630 may be implemented as a single module or as a plurality of modules that operate in cooperation with one another. Moreover, although program module 630 is described herein as being installed in memory 625, and therefore being implemented in software, it could be implemented in any hardware (e.g., electronic circuitry), firmware, software, paper, or a combination thereof.

User interface 610 includes an input device, such as a keyboard or speech recognition subsystem, for enabling a user to communicate information and command selections to processor 615. User interface 610 also includes an output device, such as a paper, display or a printer. A cursor control, such as, but not limited to, a mouse, track-ball, or joy stick, allows the user to manipulate a cursor on the display for communicating additional information and command selections to processor 615.

Processor 615 outputs, to user interface 610, a result of an execution of the methods described herein. Alternatively, processor 615 could direct the output to a remote device (not shown) via network 620 or paper.

While program module 630 is indicated as already loaded into memory 620, it may be configured on a storage medium 635 for subsequent loading into memory 625. Storage medium 635 can be any storage medium that stores program module 630 thereon in tangible form. Examples of storage medium 635 include, but not limited to, a floppy disk, a compact disk, a magnetic tape, a read only memory, an optical storage media, universal serial bus (USB) flash drive, a digital versatile disc, or a zip drive. Alternatively, storage medium 635 can be, but not limited to, a random access memory, or other type of electronic storage, located on a remote storage system and coupled to computer 605 via network 620.

The advantages to the new process allow for maintaining proper oil level to within ±⅛ inch. This assures that the customer obtains performance and savings.

The present invention having been thus described with particular reference to the preferred forms thereof, it will be obvious that various changes and modifications may be made therein without departing from the spirit and scope of the present invention as defined in the disclosure.

We claim:

1. A fryer comprising:
   a pump that pumps new oil;
   a valve connected to said pump;
   a fryer pot connected to said valve, said fryer pot having a heating source and a temperature sensor in a cooking area, said fryer pot holding used oil in said cooking area; and
   a controller that opens said valve and activates said pump to fill said fryer pot with said new oil during a top-off operation, said temperature sensor detects a temperature of said used oil that is variable based on one or more conditions each time said controller commences said top-off operation,
   wherein said controller determines if said fryer has commenced a setpoint control operation and determines a value of a setpoint minus said temperature of said used oil prior to commencement of said top-off operation.

2. The fryer of claim 1, wherein said temperature is based upon said one or more conditions selected from the group consisting of ambient conditions, set point, oil condition, rate of rise, tuning parameters, and any combination thereof.

3. The fryer of claim 1, wherein said temperature is based upon said controller commencing said setpoint control operation.

4. The fryer of claim 3, wherein said temperature is based upon when said heating source is deactivated for the first time in said setpoint control operation.

5. The fryer of claim 1, wherein said fryer pot has a pipe system that feeds said used oil into said fryer pot via said valve and feeds said new oil to said fryer pot through said pipe system through said valve.

6. A method for filling a fryer pot in a fryer with a volume of cooking oil comprising:
   determining if said fryer has commenced a setpoint control operation;
   determining a value of a setpoint minus a detected temperature by a temperature sensor in a cooking area; and
   opening a valve and activating a pump to fill said fryer pot with oil when said fryer has commenced said setpoint control operation.

7. The method of claim 6, wherein said fryer pot has a heating source, and wherein said fryer pot has used oil in said cooking area so that said temperature sensor detects a temperature of said used oil.

8. The method of claim 6, wherein said valve is opened and said pump is activated to fill said fryer pot when said heating source is deactivated for the first time during said setpoint control operation.

9. The method of claim 6, wherein said valve is opened and said pump is activated to fill said fryer pot when said temperature sensor detects a temperature of said used oil that is variable based on one or more conditions each time said top-off operation is commenced.

* * * * *